US011086196B2

(12) United States Patent
    Lowell

(10) Patent No.: US 11,086,196 B2
(45) Date of Patent: Aug. 10, 2021

(54) PHOTO GUIDE FOR VEHICLE

(75) Inventor: Neal Lowell, San Diego, CA (US)

(73) Assignee: Audatex North America, LLC, Westlake, TX (US)

( * ) Notice: Subject to any disclaimer, the term of this patent is extended or adjusted under 35 U.S.C. 154(b) by 0 days.

(21) Appl. No.: 13/601,035

(22) Filed: Aug. 31, 2012

(65) Prior Publication Data
    US 2014/0067429 A1    Mar. 6, 2014

(51) Int. Cl.
    *G06Q 40/08*    (2012.01)
    *G03B 15/00*    (2021.01)
    *G06T 19/00*    (2011.01)

(52) U.S. Cl.
    CPC ............ *G03B 15/00* (2013.01); *G06Q 40/08* (2013.01); *G06T 19/006* (2013.01)

(58) Field of Classification Search
    CPC ....... G06Q 40/08; G06T 19/006; G03B 15/00
    USPC .......................................................... 705/4
    See application file for complete search history.

(56) References Cited

U.S. PATENT DOCUMENTS

| 5,317,503 | A | * | 5/1994 | Inoue | ................ | G06Q 10/0875 |
| | | | | | | 700/90 |
| 5,432,904 | A | * | 7/1995 | Wong | ..................... | G06Q 10/04 |
| | | | | | | 701/29.3 |
| 5,717,454 | A | | 2/1998 | Adolphi | | |
| 8,035,639 | B2 | | 10/2011 | Witte | | |
| 8,239,220 | B2 | * | 8/2012 | Kidd et al. | ....................... | 705/4 |
| 8,260,489 | B2 | * | 9/2012 | Nielsen | ................. | G07C 5/085 |
| | | | | | | 701/32.2 |
| 8,510,196 | B1 | * | 8/2013 | Brandmaier | ........... | G06Q 40/08 |
| | | | | | | 705/35 |
| 8,559,766 | B2 | * | 10/2013 | Tilt | ....................... | G06T 1/0007 |
| | | | | | | 348/211.2 |
| 8,712,893 | B1 | * | 4/2014 | Brandmaier | ............ | G06F 16/51 |
| | | | | | | 705/35 |

(Continued)

FOREIGN PATENT DOCUMENTS

CN        101271469 A      9/2008
EP       1 249 793 A2      10/2002

OTHER PUBLICATIONS

Leckart, Steven, "What is that? Let your smartphone have a look" The New York Times, Aug. 31, 2011. (http://www.nytimes.com/2011/09/01/technology/personaltech/mobile-apps-make-it-easy-to-point-and-identify.html?_r=0) (Year: 2011).*

(Continued)

*Primary Examiner* — Lindsay M Maguire
(74) *Attorney, Agent, or Firm* — Baker Botts L.L.P.

(57) ABSTRACT

A device and method for assisting a user in photographing a vehicle for documenting a condition of the vehicle. The method includes receiving information regarding the vehicle and displaying a graphic overlay of the vehicle. A video image of the vehicle is captured with a camera and is displayed with the graphical overlay. The video image of the vehicle is aligned with the graphical overlay of the vehicle and the image of the vehicle is stored. The graphical overlay can be oriented on the screen in a manner so that the stored image of the vehicle is captured at a predetermined horizontal angle, vertical height and/or vehicle size. The photograph of the vehicle can be attached to an insurance estimate. Standardizing the horizontal angle, vertical and/or vehicle size of the photographed vehicle promotes consistency and uniformity in the estimating process.

3 Claims, 7 Drawing Sheets

(56) References Cited

U.S. PATENT DOCUMENTS

| | | | |
|---|---|---|---|
| 9,256,986 B2* | 2/2016 | Kasahara | G06T 19/006 |
| 2001/0033685 A1* | 10/2001 | Ishiyama | 382/154 |
| 2003/0046003 A1* | 3/2003 | Smith | G07C 5/085 |
| | | | 701/32.2 |
| 2003/0200123 A1* | 10/2003 | Burge | G06Q 10/10 |
| | | | 705/4 |
| 2004/0100572 A1 | 5/2004 | Kim | |
| 2004/0148188 A1* | 7/2004 | Uegaki | G06Q 10/06 |
| | | | 705/305 |
| 2006/0031049 A1* | 2/2006 | Smith | G06F 30/15 |
| | | | 703/9 |
| 2006/0038812 A1* | 2/2006 | Warn | G06T 19/20 |
| | | | 345/419 |
| 2006/0098112 A1* | 5/2006 | Kelly | H04N 5/23222 |
| | | | 348/333.12 |
| 2007/0159522 A1* | 7/2007 | Neven | G06Q 30/02 |
| | | | 348/14.02 |
| 2008/0208962 A1* | 8/2008 | Kim | G01S 19/14 |
| | | | 709/203 |
| 2008/0267487 A1* | 10/2008 | Siri | G06Q 10/087 |
| | | | 382/141 |
| 2009/0002364 A1* | 1/2009 | Witte, II | 345/419 |
| 2009/0138290 A1* | 5/2009 | Holden | G06Q 10/087 |
| | | | 705/4 |
| 2009/0232354 A1* | 9/2009 | Camp, Jr. | G06Q 30/02 |
| | | | 382/103 |
| 2009/0232417 A1* | 9/2009 | McMahan | G06F 17/30265 |
| | | | 382/309 |
| 2010/0265048 A1* | 10/2010 | Lu | B60Q 9/005 |
| | | | 340/435 |
| 2011/0081948 A1* | 4/2011 | Shirai | G06T 11/60 |
| | | | 455/556.2 |
| 2011/0122125 A1* | 5/2011 | Yoon | G06F 16/358 |
| | | | 345/419 |
| 2014/0081876 A1* | 3/2014 | Schulz | G06Q 10/06 |
| | | | 705/305 |

OTHER PUBLICATIONS

Brown, M. "Free Ipone App Identifies Tree Leaves" Wired UK. May 9, 2011 (http://www.wired.com/2011/05/iphone-leaf-identification/) (Year: 2011).*

International Search Report (PCT/US2013/056848) dated Feb. 24, 2014.

Ying Li et al, "Applying Image Analysis to Auto Insurance Triage: A Novel Application", Multimedia Signal Processing 2007, IEEE 9th Workshop on, IEEE, Piscataway, NJ, Oct. 1, 2007, pp. 280-283.

National Intellectual Property Administration, P.R. China, Reexamination Decision (Decision No. 200175) with translation, Jan. 16, 2020.

Brazilian Search Report Appln. BR112015004251-1 (English translation), Published Jun. 9, 2020.

Canadian Search Report Appln. 2,882,341, dated May 1, 2020.

Canadian Search Report transmittal letter, dated May 14, 2020.

Translation of Second Office Action, Pat. App. 202010289697 CN, dated May 17, 2021.

Second Office Action in Chinese, Pat. App. 202010289697 CN, dated May 17, 2021.

Ying Li, et al., "Applying Image Analysis to Auto Insurance Triage: A Novel Application," © 2007 UTC from IEEE Explore, pp. 280-283, Downloaded Oct. 26, 2020.

* cited by examiner

| Claim # : 2345634523541234 | Desc: | Status: Assigned | Gross Total: |

VIN Selection

Assignment VIN | Inspection VIN *102* | Reason For No VIN
[ Copy ] | WDBWK54F86F121718 | [ ▼ ]
AudaVIN Information Received.

Vehicle Information

⦿ Vehicle Selection *104* ◯ Vehicle Not Listed *106* *108*
- Origin: European ▼
- Make: Mercedes-Benz ▼
- Year: 2006 ▼
- Model: SLK280 ▼ *110*
- Style: STD 2D Convertible 2WD Gasoline ▼ *112*
- Engine: 6cyl Gasoline 3.0 ▼
- Transmission: 7-Speed Automatic ▼
- Mileage: *114*
- Typical Mileage: *116*
- Mileage Type: Actual ▼

Other Vehicle Information

- Lic. Plate:
- Lic. State: ▼
- Lic. Expire:
- Condition: ▼
- Veh Insp#:
- Prod Date:

| | Paint Code | Color |
|---|---|---|
| Exterior: | | |
| Interior Trim: | | |

---

Claim # : 2345634523541234 | Desc: | Status: Assigned | Gross Total:
2006 Mercedes-Benz SLK280
Packages and Options   Aftermarket Items

Packages | Package Description
☐ Comfort Package(T) | *Comfort Package(T)*
☐ Heating Package(T) | -Includes Automatic Dimming Mirror, Driver Seat Memory, Dual Power Seats, Pwr Tilt/Tele. Str Wheel
☑ *Premium Package* | *Heating Package(T):*
☐ Wood Trim Package | -Included Heated Front Seats, AIRSCARF Ventilated Headrest
 | *Premium Package:*

Options

Optional Equipment
- ☐ Automatic Dimming Mirror(T)
- ☐ Cargo/Trunk Liner
- ☐ Cellular Telephone
- ☐ Driver Seat Memory(T)
- ☐ Dual Power Seats(T)
- ☑ *Garage Door Opener*
- ☐ Headlight Washers
- ☐ Heated Front Seats(T)
- ☐ Harman Kardon Sound Sys
- ☑ *AM/FM In-dash CD Changer*
- ☐ Leather/Wood Steer Wheel
- ☑ *Metallic Paint*
- ☐ Navigation System
- ☐ Pwr Tilt/Tele. Str Wheel(T)
- ☐ Run-Flat/Self-Seal Tires
- ☑ *Rain-Sensing W/S Wipers*
- ☐ Sirius Satellite Radio
- ☐ Tire Pressure Monitor
- ☐ Wood Interior Trim
- ☐ Xenon Headstamps Optional Equipment
- ☑ *Anti-lock Brakes*
- ☑ *Air Conditioning*
- ☑ *Alarm System*

☐ None      (S)Standard, (T) - Typical

PHOTO GUIDE FOR VEHICLE

BACKGROUND OF THE INVENTION

1. Field of the Invention

The subject matter disclosed generally relates to a method and system for photographing the vehicle.

2. Background Information

When a vehicle such as an automobile is damaged the owner may file a claim with an insurance carrier. A representative typically inspects the vehicle to determine the amount of damage and the costs required to repair the automobile. The owner of the vehicle or the vehicle repair facility may receive a check equal to the estimated cost of the repairs. If the repair costs exceed the value of the automobile, or a percentage of the car's value, the representative may "total" the vehicle. The owner may then receive a check based on the value of the automobile.

The repair costs and other information may be entered by the representative into an estimate report. After inspection the representative sends the estimate report to a home office for approval. To improve the efficiency of the claims process there have been developed computer systems and accompanying software that automate the estimate process. By way of example, the assignee of the present invention, Audatex, Inc., ("Audatex") provides a software product under the trademark Audatex Estimating that allows a representative to enter claim data. The data is processed into an estimate for repairing the vehicle and/or a valuation report of the vehicle.

Photographs of the damaged vehicle are sometimes used in the estimating process. By way of example, the photograph may be attached to the estimate. To promote consistency in generating insurance estimates it is desirable to capture vehicle photographs in a systematic manner. When photographing a vehicle it is desirable to take into consideration the horizontal angle, vertical height, resolution and quality of the photo along with the size of the vehicle within the photo.

BRIEF SUMMARY OF THE INVENTION

A device and method for assisting a user in photographing a vehicle for documenting a condition of the vehicle. The method includes receiving information regarding the vehicle and displaying a graphic overlay that is associated with the information. A video image of the vehicle is captured with a camera and is displayed with the graphical overlay of the vehicle. The video image of the vehicle is aligned with the graphical overlay of the vehicle and the image of the vehicle is stored.

BRIEF DESCRIPTION OF THE DRAWINGS

FIG. 6 is an illustration of a estimating page with different vehicle information fields;

FIG. 7 is a graphical user interface used to enter and/or select damaged parts of a vehicle; and, FIG. 8 is a graphical user interface that provides a running cost total for the repair estimate of the damaged vehicle.

DETAILED DESCRIPTION

Disclosed is a device and method for assisting a user in photographing a vehicle to document the condition of the vehicle. The method includes receiving information regarding the vehicle and displaying a graphic overlay of the vehicle. A video image of the vehicle is captured with a camera and is displayed with the graphical overlay. The video image of the vehicle is aligned with the graphical overlay of the vehicle and the image of the vehicle is stored. The graphical overlay can be oriented on the screen in a manner so that the stored image of the vehicle is captured at a predetermined horizontal angle, vertical height and/or vehicle size. The photograph of the vehicle may be attached to an insurance estimate. Standardizing the horizontal angle, vertical and/or vehicle size of the photographed vehicle promotes consistency and uniformity in the estimating process. Although utilization with an insurance estimate is described, the photograph of the vehicle can be used in other application where it is desired to document the condition of the vehicle. The overlay may be an outline of the entire vehicle or an outline of a portion of the vehicle. For example, the overlay may be an outline of a door of the vehicle. The user can then utilize the overlay to take a photograph of the vehicle door.

Figure 1:
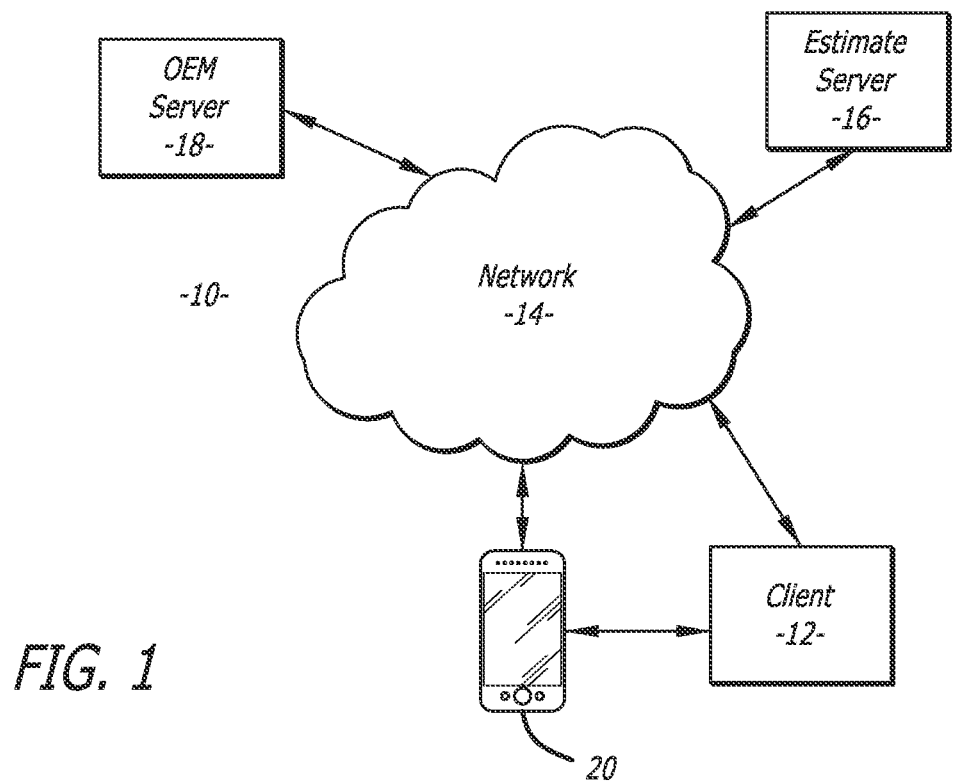
FIG. 1 is a schematic of a system that can be used to photograph a vehicle.

Referring to the drawings more particularly by reference numbers, FIG. 1 shows a system 10 that can be used to photograph a vehicle to document a condition of the vehicle. The system 10 may include at least one client 12 that is connected to an electronic communication network 14. The electronic communication network 14 may be a wide area network (WAN) such as the Internet. Accordingly, communication may be transmitted through the network 14 in TCP/IP format. The client 12 could be any type of device that can access the network 14.

The system 10 may further include an claim server 16 connected to the network 14. The claim server 16 may provide a web based portal that provides access to a repair cost estimate and/or a vehicle valuation web site. The web site may provide one or more web pages that can be used by a representative to generate a repair cost estimate and/or a vehicle valuation. By way of example, the representative may utilize the web pages to determine the estimate and/or a vehicle valuation of a vehicle or claims adjuster submitting vehicle information on a theft claim, or a policy system that requires vehicle data to provide a price quote. Although one claim server 16 is shown, it is to be understood that the claim server may include two or more separate servers including a web server and an application server that together perform various functions.

The system may also include an OEM server 18 that can be coupled to the claim server 16 and clients 12 through the network 14. The OEM server 18 may contain a database that includes vehicle model information and vehicle option information. The OEM server 18 may provide vehicle model information and vehicle options information based on a VIN. Although a web based system is shown and described, it is to be understood that a non-web based system could be employed.

The system 10 may also include a camera device 20 that can be used to capture an image of a vehicle. The device 20 may be a smartphone, tablet or a similar device that contains a camera, a screen and processing to create a graphic overlay. The camera device 20 may be coupled to the client 12.

Figure 2:
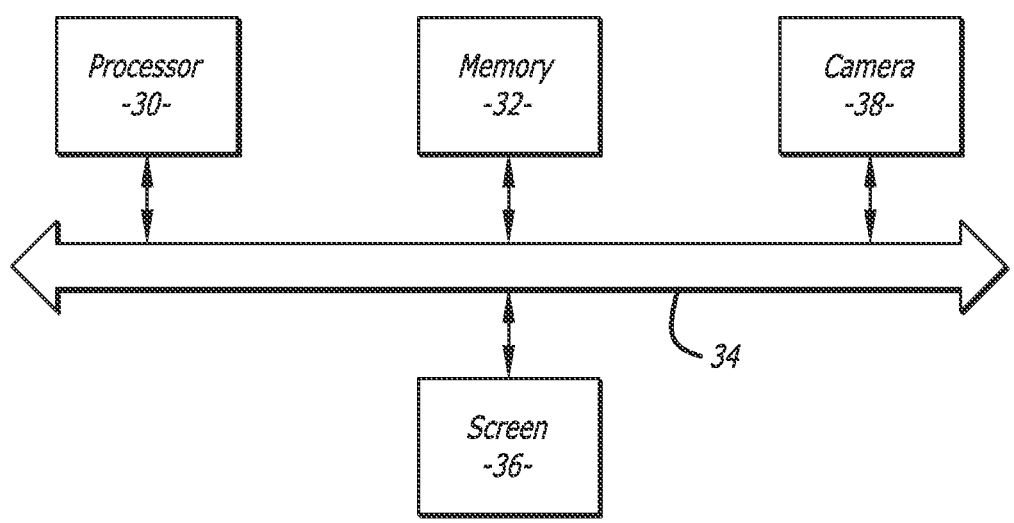
FIG. 2 is a schematic of a camera device of the system.

FIG. 2 shows an embodiment of a camera device 20. The camera device 20 includes a processor 30 connected to one or more memory devices 32 through a bus 34. The memory device 32 may include both volatile and non-volatile memory such as read only memory (ROM) or random access memory (RAM). The processor 30 is capable of operating software programs in accordance with instructions and data stored within the memory device 32. Without limiting the scope of the invention the term computer readable medium may include the memory device 32. The computer readable medium may contain software programs in binary form that can be read and manipulated by the processor 30.

The camera device 20 further includes a screen 36 and a camera 38. The device 20 may also include transceivers and network ports to communicate with external sources such as the servers 16 and 18 shown in FIG. 1.

The servers 16 and 18 may contain relational databases that correlate data with individual data fields and a relational database management system (RDBMS). The RDBMS of the server 16 may include a reference to a website that can be accessed by the client 12 and/or camera device 20. The website has one or more specific uniform resource locators (URL) that can be used to access the site through the network 14. The URL can be entered through a web-based application resident in the client computer 12 and/or device 20. By way of example, the web based application may be a browser. Servers 16 and/or 18 may contain a database of graphic overlays that are associated with vehicle information.

Figure 3:
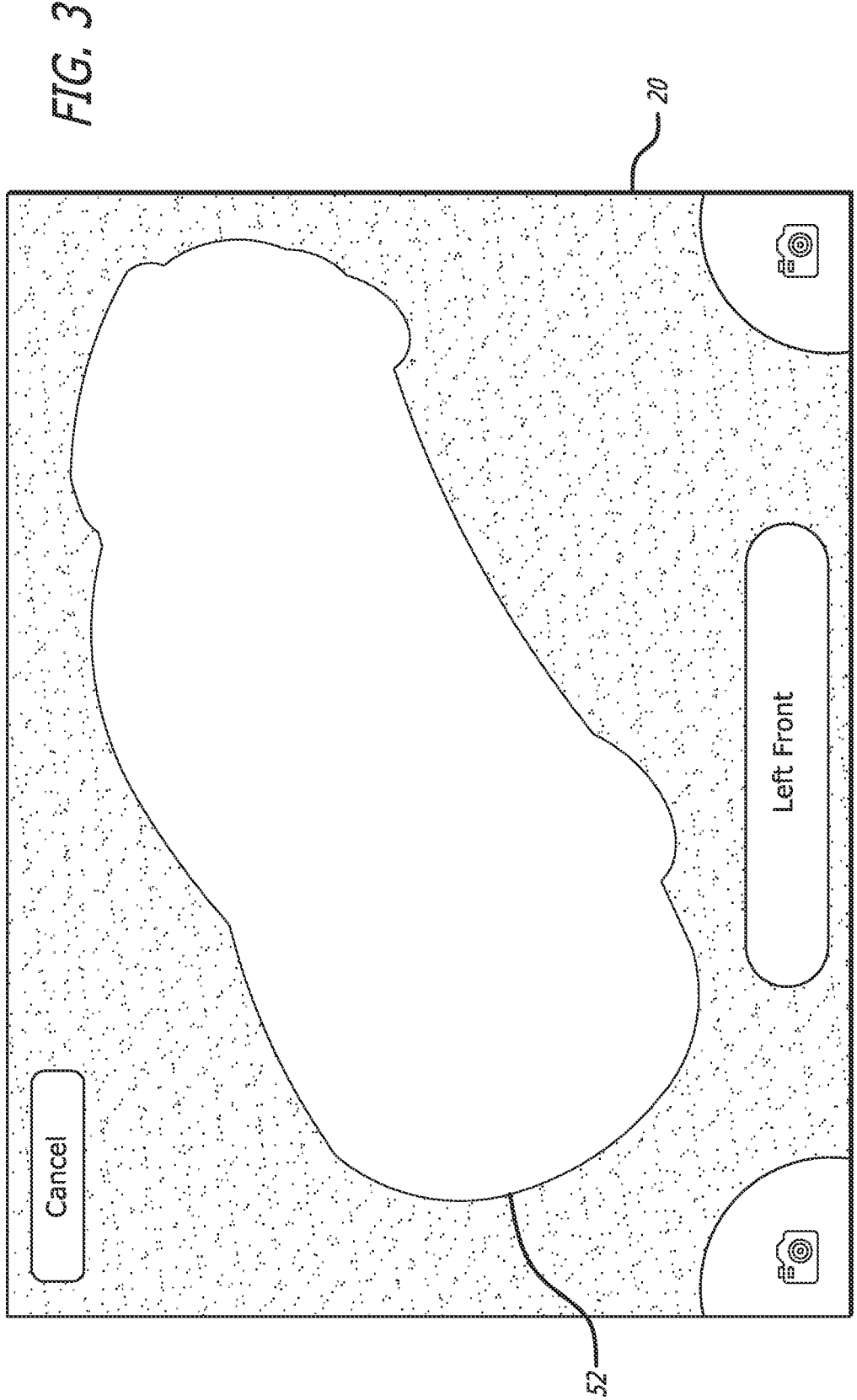
FIG. 3 is an illustration showing a graphical overlay of a vehicle.
Figure 4:
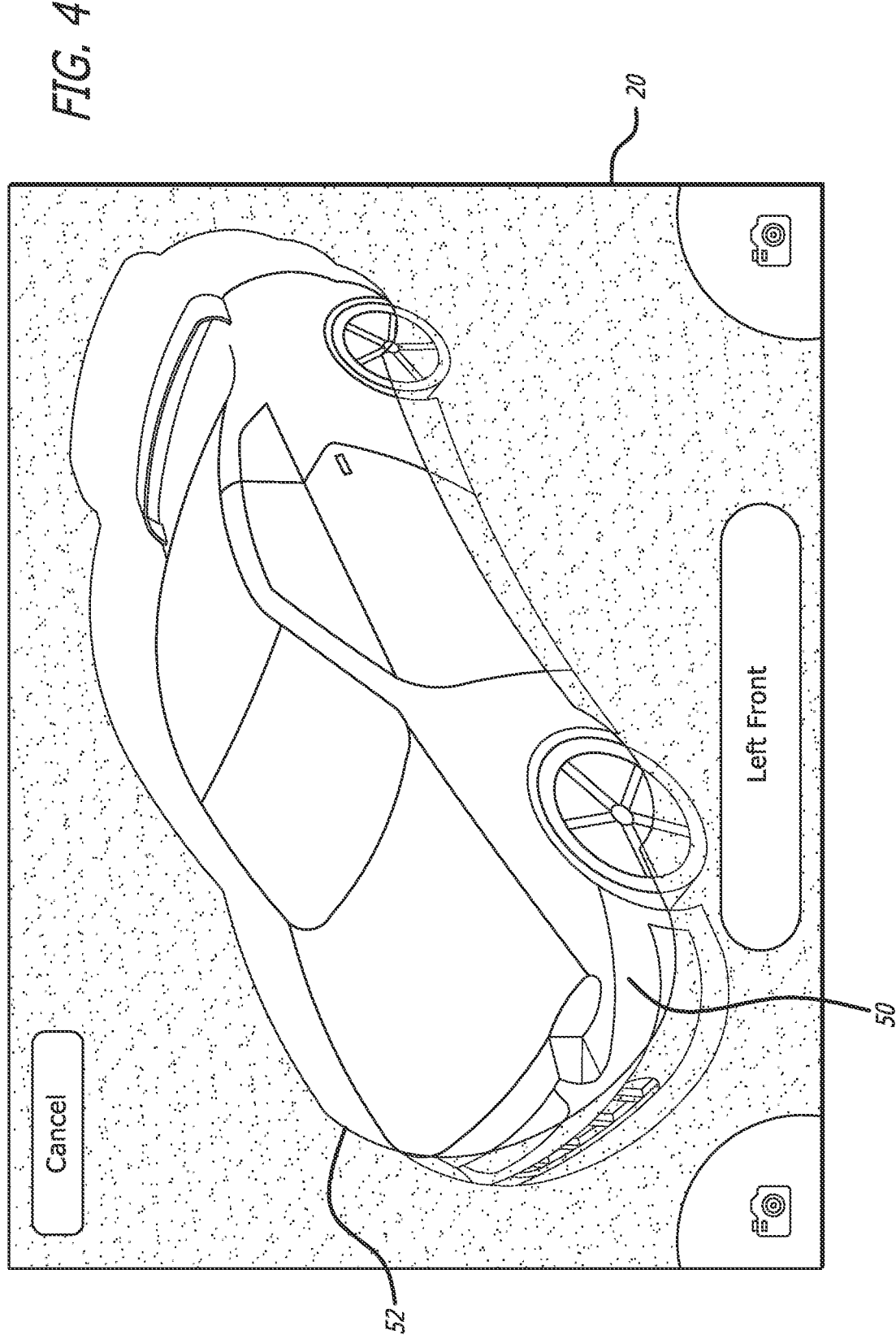
FIG. 4 is an illustration showing a vehicle image and the graphic overlay out of alignment.
Figure 5:
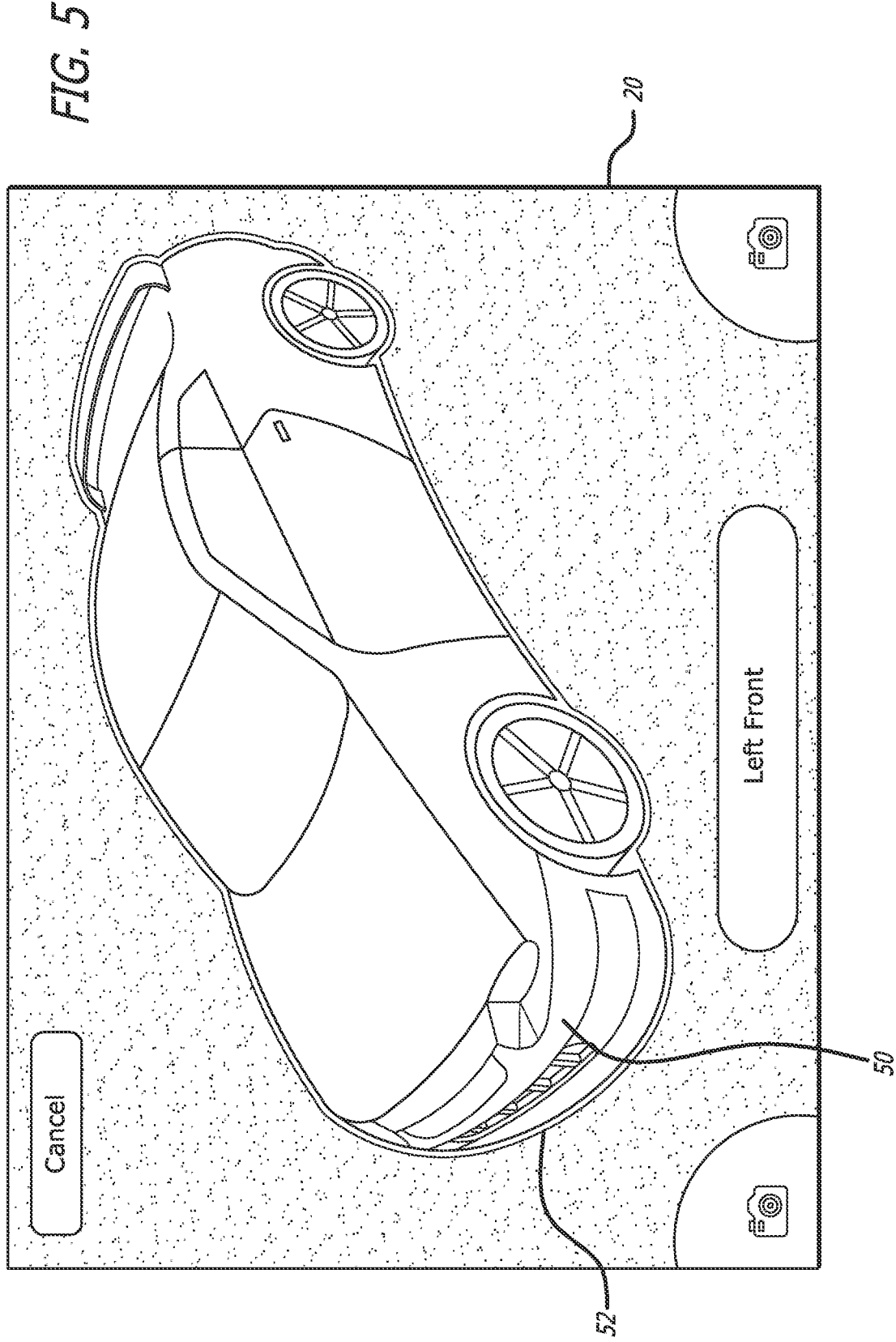
FIG. 5 is an illustration showing the vehicle image aligned with the graphic overlay.

FIGS. 3, 4 and 5 shows how a photograph of a vehicle 50 can be captured using a graphic overlay 52 The user can enter information regarding the vehicle. For example, the user can input the year, make and model of the vehicle. A graphic overlay 52 of the identified vehicle is displayed on the camera device 20 as shown in FIG. 3. As shown in FIG. 4, the user can then operate the camera device to obtain an image of the vehicle 50 that displayed with the graphic overlay 52. The graphical overlay 52 may be transparent so that the user can see the image of the vehicle. Although a process wherein the overlay 52 is displayed before the image of the vehicle 50, it is to be understood that the process may be reversed so that the vehicle 50 can be displayed before the overlay 52.

The user can move the camera to align the vehicle image 50 with the graphical overlay 52 as shown in FIG. 5. The vehicle image 50 can be stored in memory when the image 50 is aligned with the graphical overlay 52. This can be accomplished by the user "clicking" the camera to capture the image of the vehicle 50. The graphical image 52 can be displayed in a manner so that the stored image has a predetermined horizontal angle, vertical height, size, resolution and/or quality. The stored image may be provided with an insurance estimate. Creating standardized image parameters such as horizontal angle and height promotes consistency and uniformity in the estimating process.

The graphical overlay 52 can be created by extrapolating a 2D image showing only the outline and various highlights of the vehicle from a 3D model of the vehicle. The area between the outline may be shaded but still transparent when overlayed onto the video image captured by the camera. The color of the shaded area and outlines can be varied. For example, the shaded area and outlines may be gray, but the user can change the color to yellow. This would be desirable if the vehicle is gray and would be difficult to distinguish from a gray shaded area and outline. Some vehicle components, such as the front driver side wheel may be created in the overlay 52. This would allow the user to align the wheel of the image captured by the camera with the graphical wheel provided by the overlay.

By way of example, the assignee Audatex has a database(s) that contains 3D models of various vehicles. The overlays may be created from these 3D models. For example, the 3D models can be rotated and otherwise manipulated to achieve the desired horizontal angle, vertical height and vehicle size. The outline of the 3D model is then extrapolated to create the overlay 52. Overlays for various vehicles can be created and stored in a database(s).

The photograph of the vehicle can be used in a process to create an insurance estimate. FIG. 6 shows an example of an claim page 100 used to create an insurance estimate. The claim page may include a VIN field 102 that allows a user to enter a VIN. The page 100 may include vehicle information fields, including but not limited to ORIGIN 104, MAKE 106, YEAR 108, MODEL 110, STYLE 112, ENGINE 114 and TRANSMISSION 116, exterior and interior Paint code, color, refinish type and production date fields. The page may further include vehicle package fields 118 and vehicle option fields 120 that can be selected and deselected to indicate the options of a vehicle. Entering the VIN may automatically populate certain fields of the page 100.

Figure 7:
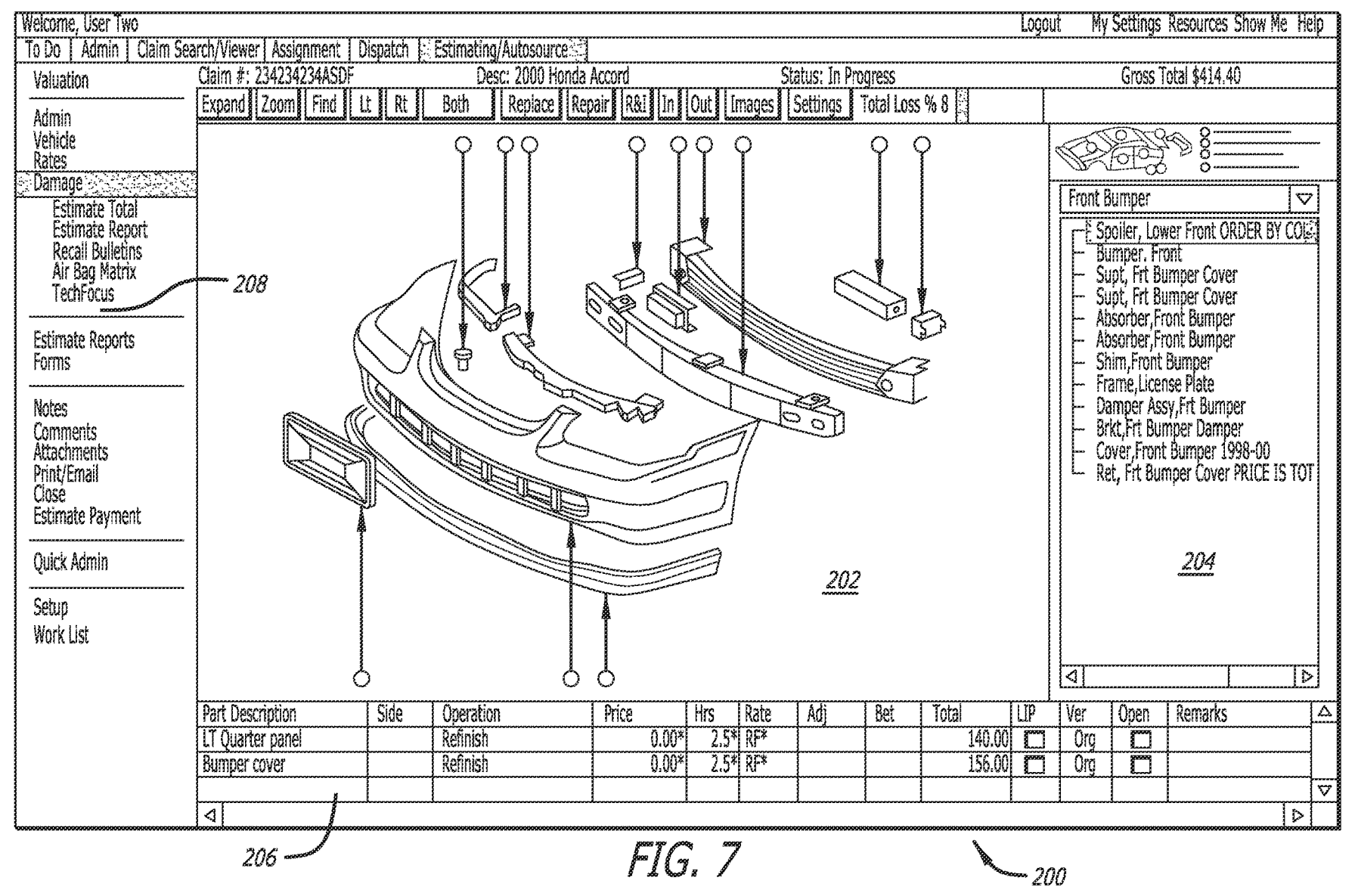
Figure 8:
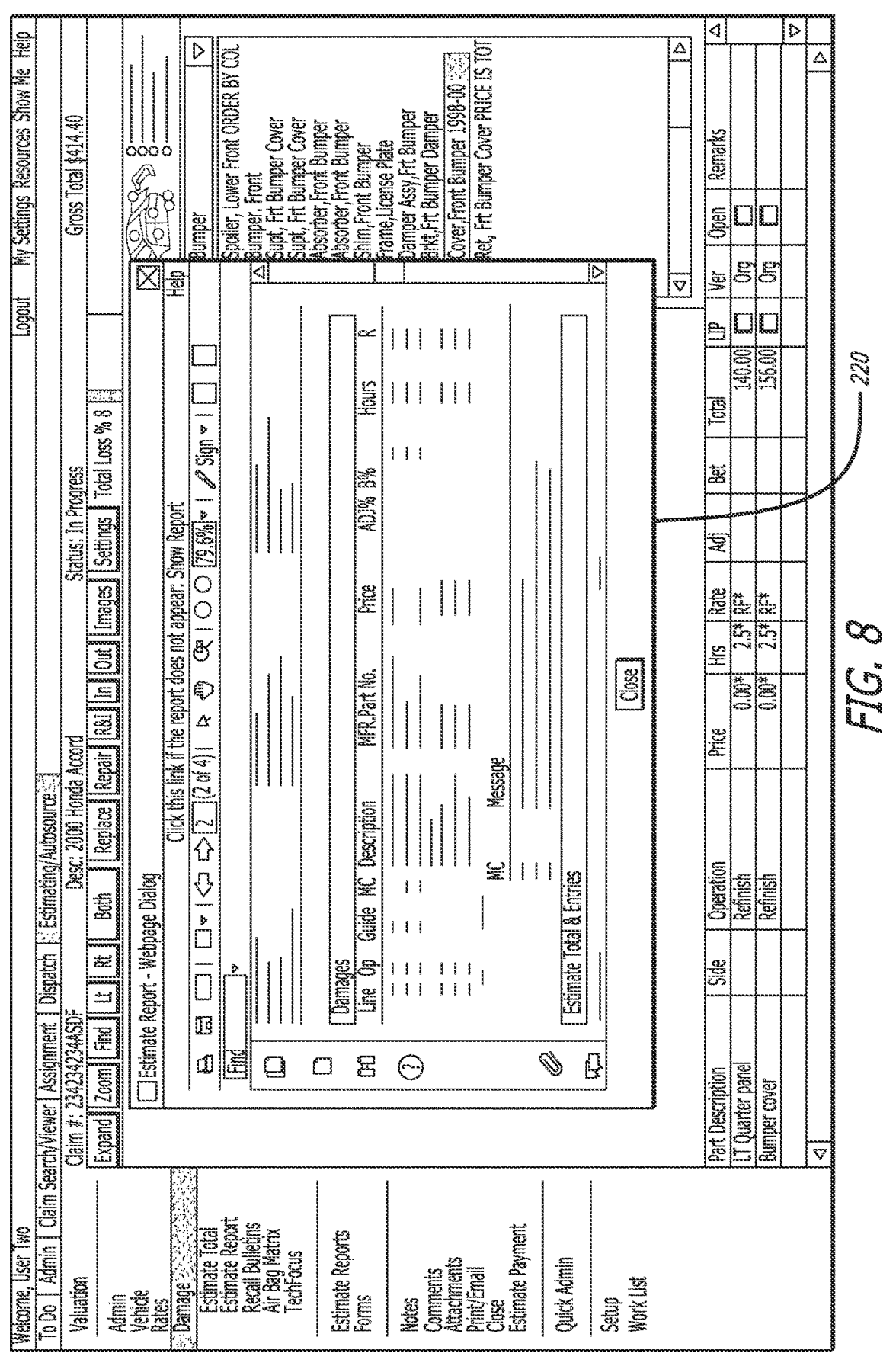

A representative may enter and/or select damaged parts for the vehicle. FIG. 7 shows an example of an estimating page 200 that allows the user to enter and/or select damaged parts of a vehicle. The page 200 may include a graphical section 202 that can be selected by the representative and a text section 204 that lists a plurality of selectable parts for the vehicle. The parts that are selected to be replaced or repaired can be listed in section 206. An estimate page can be displayed by selecting the "Estimate Total" link 208 shown in FIG. 6. FIG. 8 shows a page 220 that displays a running cost total of the estimated damage of the vehicle. The process may have a feature (not shown) that provides a warning to the representative that the cost total exceeds a "totaled" value at which point the representative may discontinue the process and request a vehicle valuation. After all of the parts to be repaired or damaged are selected the representative may obtain a final repair cost estimate and/or vehicle valuation. The photograph of the vehicle can be associated with the estimate. For example, the photograph can be attached to the estimate file.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for generating an insurance estimate for a damaged vehicle, comprising:

a camera that receives user input regarding a year, make and model of the vehicle, said camera including a processor that causes a screen to display an image of the vehicle and a graphical overlay that includes a 2D image outline of the vehicle, that are visible to a user, the graphical overlay is in a shape that has an outline of the vehicle and is located at a predetermined orientation relative to said screen, said predetermined orientation including a predetermined horizontal angle and predetermined vertical height, said graphical overlay comprising a transparent area surrounded by the outline of the vehicle, the transparent area being devoid of any other graphical overlays, said graphical overlay of the vehicle is created by extrapolating said 2D image outline from a 3D model of the vehicle, said camera captures a screen shot when said image of said vehicle is aligned with said graphical overlay, said camera including memory that stores said screen shot, and an estimate server that receives said screen shot from said camera, said estimate server displays one or more estimate pages are used by an operator to generate an estimate to repair the damaged vehicle and attaches said screen shot to an estimate file that contains said estimate.

2. The system of claim 1, wherein said graphical overlay of the vehicle is provided by a database of vehicle graphic overlays.

3. The system of claim 1, wherein said graphical overlay depicts a portion of the vehicle.

\* \* \* \* \*